United States Patent [19]

Horikawa et al.

[11] Patent Number: 4,745,270
[45] Date of Patent: May 17, 1988

[54] PHOTOELECTRIC MICROSCOPE USING POSITION SENSITIVE DEVICE

[75] Inventors: Yoshiaki Horikawa; Masao Kuga, both of Hachiouji, Japan

[73] Assignee: Olympus Optical Co., Ltd., Tokyo, Japan

[21] Appl. No.: 856,155

[22] Filed: Apr. 25, 1986

[30] Foreign Application Priority Data

Apr. 26, 1985 [JP] Japan .......................... SHO 60-88972

[51] Int. Cl.⁴ ............................................... H01J 3/14
[52] U.S. Cl. ..................................... 250/216; 250/234
[58] Field of Search ................... 250/234, 235, 216; 350/6.2, 6.5–6.9; 356/442, 444, 432

[56] References Cited

U.S. PATENT DOCUMENTS

| | | | |
|---|---|---|---|
| 4,318,582 | 3/1982 | Minoura et al. | 350/6.6 |
| 4,329,012 | 5/1982 | Minoura et al. | 350/6.8 |
| 4,455,485 | 6/1984 | Hosaka et al. | 250/234 |
| 4,634,876 | 1/1987 | Ayata | 250/548 |

OTHER PUBLICATIONS

Coded Apertures and Detectors for Optical Differentiation—Tony Wilson et al., University of Oxford, Dpt. of Engineering Science, Parks Road, Oxford, OX1 3PJ., U.K.—pp. 203–209.

Proceeding of SPIE, 1980, vol. 232, pp. 203–209, T. Wilson.

Publication "O plus E"; March 1981 Edition, No. 116, pp. 79–87, Japan.

Primary Examiner—David C. Nelms
Assistant Examiner—Stephone B. Allen
Attorney, Agent, or Firm—Cushman, Darby & Cushman

[57] ABSTRACT

In order to enable an easy acquisition of a bright excellent differential image and an excellent ordinary image of an object requiring observation, the photoelectric microscope using a position sensitive device in accordance with the present invention comprises: a laser light source; an objective lens for collecting, onto the object requiring observation, a laser light emitting from the light source; a beam splitter disposed between the light source and the objective lens; a position sensitive device receiving the laser light emitting from the light source and having transmitted through the object requiring observation; and a position sensitive device receiving, through the beam splitter, the laser light reflected from the object requiring observation. To allow two-dimensional scanning, a pair of opposing galvanometric mirrors may be disposed at a pupil position between the beam splitter and the objective lens. An image processing and indicating means is connected to these position sensitive devices to make easy a simultaneous observation by a plurality of observers.

9 Claims, 5 Drawing Sheets

PHOTOELECTRIC MICROSCOPE USING POSITION SENSITIVE DEVICE

BACKGROUND OF THE INVENTION (a) Field of the Invention

The present invention relates to a scanning type optical microscope, and more particularly to a photoelectric microscope using a position sensitive device.

(b) Description of the Prior Art

In scanning type optical microscopes, there has been proposed a method of obtaining a differential image by using a detector comprised of split detectors and by obtaining the difference in the signals derived from these split detectors, or more accurately, by dividing the difference signal by the sum signal. For example, in "Proceeding of SPIE", 1980, vol. 232, page 203, T. Wilson et al state that a differential image can be detected so on a scanning type optical microscope.

The principle thereof will be explained below. To begin with, a scanning type optical microscope is arranged so that, as shown in FIG. 1, a light coming from a spot light source 1 such as a laser is collected by an objective lens 2 to illuminate a sample 3, and the light which has been transmitted through the sample 3 is detected by a detector 4. Along therewith the sample 3 is subjected to a raster-scanning in a direction normal to the optical axis, and, in synchronism therewith the detection signal is imaged on a television screen, whereby a microscopic image of the sample 3 can be observed. When compared with the conventional microscopes, the scanning type optical microscope illuminates the sample 3 by a spot light, so that flare or like phenomenons are eliminated, and as a result a substantially improved image is obtained.

In such a case, by constructing the detector 4 with two detectors 5 and 6, and by using a difference signal of the outputs from the respective detectors, there is obtained a differential image.

Here, description will be made of the logic of formation of a differential phase image.

For the sake of simplicity, a one-dimensional image is considered. The intensity of an image due to a partial coherent focusing is indicated, in general, as follows:

$$I(x) = \iint_{-\infty}^{\infty} C(m;p)T(m)T^*(p)\exp 2\pi j\{(m-p)x\}dmdp$$

wherein:

T(m) represents the Fourier conversion of the transmittivity of an object; and

C(m;p) corresponds to the transfer function of the optical system.

When the sensitivity of the detectors is assumed to be $D(\xi)$, and when the pupil function of the optical system is assumed to be $P(\xi)$, then C(m;p) is indicated by $$C(m;p) = \int_{-\infty}^{\infty} D(\xi)P(\lambda fm - \xi)P^*(\lambda fp - \xi)d\xi$$

wherein:

f represents the focal distance of the system; and

λ represents the wavelength of the light.

Here, an object having a weak contrast is considered. In such a case, it is only necessary to consider C(m;0). When the difference between the signals is considered, assuming that $D(\xi)$ is the sensitivity of the split detectors, C(m;0) will assume such a pattern as shown in FIG. 2. The fact that the transfer function takes such a pattern as this indicates that the differentiation of the image is obtained. Also, when the sum signal is employed, there is obtained an ordinary image. As stated above, only by the change in the mode whether the difference between the signals is used, or the sum of the signals is used, is there the feature that either a differential image or an ordinary image is obtained.

Here, split detectors 7 and 8 whose sensitivity distribution D(x) assumes a wedge form as shown in FIG. 3 will be considered. Reference numeral 9 represents an optical axis. When the difference in the signals delivered from these detectors is employed, C(m;0) becomes as shown in FIG. 4, and a differential image which is superior to that obtained in the case of FIG. 2 is provided. In case of using a sum signal, however, there is the drawback that the image becomes one with stressed high frequency components.

As stated above, the conventional art has employed split type detectors, which, accordingly, had the drawback that when it was intended to obtain an excellent differential image, there could not be obtained an excellent ordinary image. Also, the center of the interface of the split detectors had to be aligned with the optical axis, and thus an adjustment therefor was required. Also, in order to modify the sensitivity of the detector into a wedge form, there was the necessity, in practice, to use a filter or like means, with the result that the amount of light could not be utilized efficiently. Furthermore, when assembling actual circuitry, two amplifiers were required, which gave rise to the problem that the device became costly.

SUMMARY OF THE INVENTION

It is, therefore, a primary object of the present invention to provide a photoelectric microscope using a position sensitive device which can provide an excellent differential image and an excellent ordinary image.

Another object of the present invention is to provide a photoelectric microscope using a position sensitive device which does not require an adjustment of the position of the detector so as to be aligned with the optical axis.

Still another object of the present invention is to provide a photoelectric microscope using a position sensitive device which can effectively utilize the given amount of light.

A further object of the present invention is to provide a photoelectric microscope using a position sensitive device which can be manufactured at a low cost.

The photoelectric microscope using a position sensitive device according to the present invention is comprised of a position sensitive device 10 serving as a, as shown in FIG. 5. As an example of this position sensitive device, there is one which utilizes the "lateral photo effect". As a product example thereof, there is the non-scanning type position sensor made by Hamamatsu Photonics Kabushiki Kaisha in Japan.

FIG. 6 shows the basic structure of the PSD (Position Sensitive Device) made by Hamamatsu Photonics K. K. This device is comprised of a highly resistive Si-substrate 11, a p-type resistive layer 12 and an n+ type layer 13 sandwiching the substrate 11 therebetween, a common electrode 14 connected to said n+ type layer 13, and electrodes 15 and 16 which are connected to the p-type resistive layer 12. The surface layer forms a pn junction and has a photo effect, so that when a light impinges thereon, there are obtained outputs $I_A$ and $I_B$ from the electrodes 15 and 16 depending on the site illuminated by the light. Let us here assume that the distance between the electrodes 15 and 16 is l, that the resistance value thereacross is Rl, that the distance from the electrode 15 to the position 17 of incidence of light is x, and that the resistance value of that portion of the layer corresponding to the distance x is Rx. The photocurrent produced by the incident light is denoted as $I_o$. Then, we get $$I_A = \frac{Rl - Rx}{Rl} \cdot I_o, \quad I_B = \frac{Rx}{Rl} \cdot I_o \tag{1}$$

If the resistive layer is uniform, Equation (1) will become $$I_A = \frac{l - x}{l} I_o, \quad I_B = \frac{x}{l} I_o \tag{2}$$

$$\therefore \frac{I_A - I_B}{I_A + I_B} = \frac{l - 2x}{l} \tag{3}$$

Accordingly, by performing a mathematical operation as shown by (3) mentioned above based on outputs $I_A$ and $I_B$, it is possible to obtain the position of incidence of light regardless of the energy of incidence. Just for reference, the incidence energy $I_o$ can be obtained by $$I_o = I_A + I_B \tag{4}$$

(see "O plus E", March 1981 Edition, No. 16, pp. 79-87).

The above statement concerns one-dimensional PSD, but the same applies equally to a two-dimensional PSD.

Next, the instance wherein a certain image 1(x, y) is focused on the PSD 10, e.g., the instance wherein a light-amount distribution 18 is produced on the PSD 10 as shown in FIG. 7, will be considered. For the sake of simplicity, the description will be based on one-dimension, and the image intensity distribution is assumed to be I(x). Then, the outputs $I_A(x)$ and $I_B(x)$ of the electrodes 15 and 16 due at the light incident to the site x will be $$I_A(x) = \frac{l - x}{l} I_o(x), \quad I_B(x) = \frac{x}{l} I_o(x) \tag{5}$$

so that the outputs $I_A$ and $I_B$ from the electrodes 15 and 16 extending to the entire image will become $$I_A = \int I_A(x)dx \tag{6}$$
$$= \int \frac{l-x}{l} I_o(x)dx$$
$$= \int I_o(x)dx - \frac{1}{l} \int I_o(x)xdx$$

and likewise $$I_B = \frac{1}{l} \int I_o(x)xdx \tag{7}$$

Thus, it is noted from Equations (6) and (7) that detection signals which are proportional to the illuminated sites are obtained. That is, there are obtained signals similar to that having such a detection sensitivity D(x) as shown in FIG. 8. This is same as that formed by downwardly rotating, about a point on the axis x, the D(x) line which is shown on the detector 7 in FIG. 3. Thus, an excellent differential image is obtained. The detection sensitivity which is noted to be negative can be obtained in a simple manner by appropriately increasing or decreasing the bias voltage applied. The signal may use only the output $I_A$, or only $I_B$, or $I_A - I_B$. Also, if a mathematical operation $I_A + I_B$ is performed to obtain an ordinary image, there is obtained $\int I_o(x) dx$, and thus there is obtained a characteristic which is altogether the same as that obtained from a non-split type ordinary photodiode. As such, there can be obtained an excellent ordinary image also. Further, in case the optical axis is shifted, it is only necessary to adjust the biasing voltage, and accordingly there is no need to make an alignment adjustment of the detector itself relative to the optical axis. Also, there can be obtained such a sensitivity distribution as shown in FIG. 8 without any reduction of the amount of light by a filter or like means, and thus it is possible to always effectively utilize the amount of light. Furthermore, in case an actual circuitry is constructed, there is needed only one amplifier, so that the manufacturing cost can be reduced.

Also, by employing a two-dimensional PSD, there is an advantage also such that, by varying the ratio of use of the X-directional signal and the Y-directional signal, the orientation of differentiation can be varied arbitrarily and easily.

These and other objects as well as other features and advantages of the present invention will be apparent from the following detailed description of the preferred embodiment when taken in conjunction with the accompanying drawings.

DETAILED DESCRIPTION OF THE PREFERRED EMBODIMENTS

The present invention will hereunder be described in further detail based on the respective embodiments illustrated.

Figure 1:
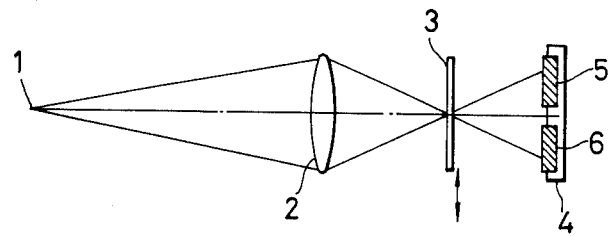
FIG. 1 is an explanatory illustration showing the principle of the conventional scanning type optical microscope.
Figure 2:
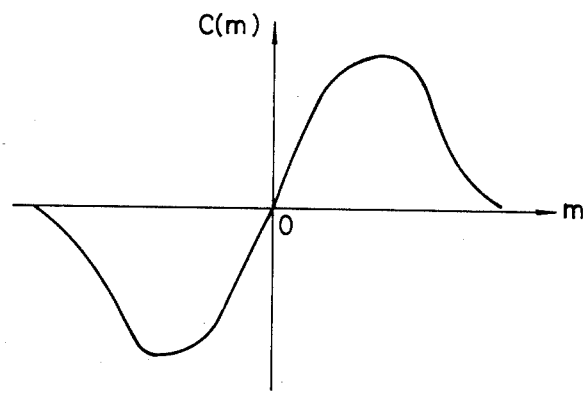
FIG. 2 is an illustration showing the transfer function in case a signal difference is considered in the conventional scanning type optical microscope.
Figure 3:
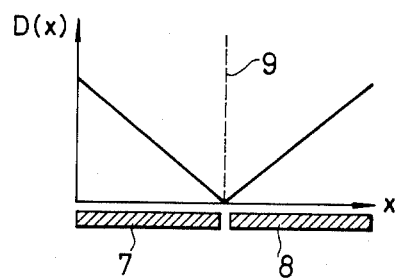
FIG. 3 is an illustration showing the instance wherein the sensitivity distribution of the split detectors is rendered to a wedge form.
Figure 4:
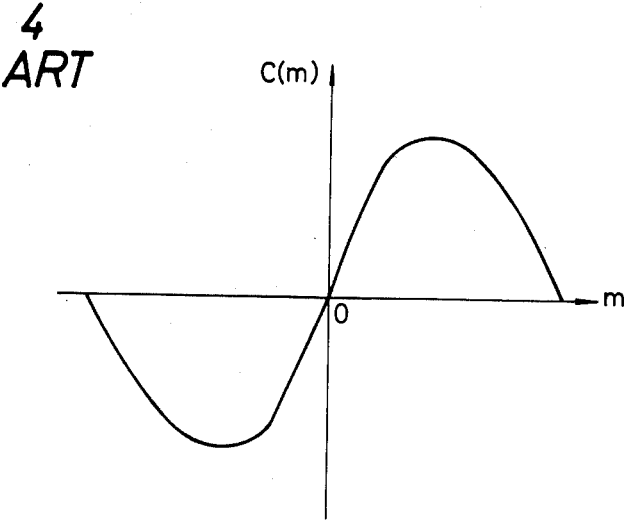
FIG. 4 is an illustration showing the transfer function in case the signal difference of the split detectors of FIG. 3 is employed.
Figure 5:
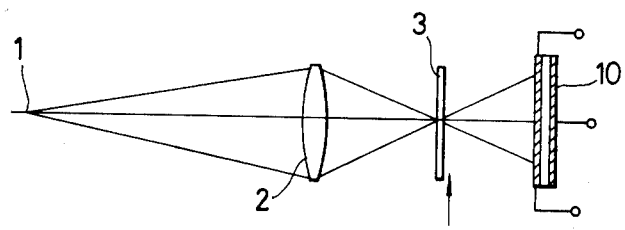
FIG. 5 is an explanatory illustration showing the principle of the photoelectric microscope using a position sensitive device according to the present invention.
Figure 6:
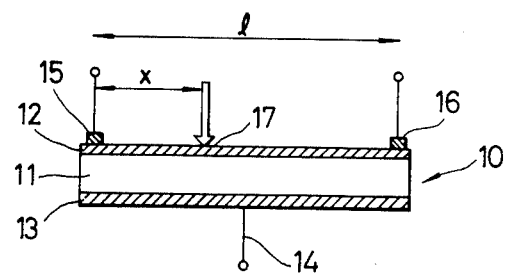
FIG. 6 is a sectional view showing the basic structure of a PSD.
Figure 7:
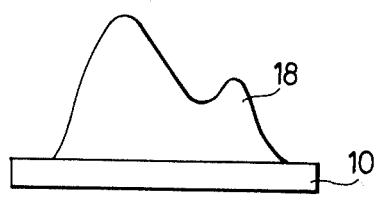
FIG. 7 is an illustration showing the light-amount distribution on the PSD.
Figure 9:
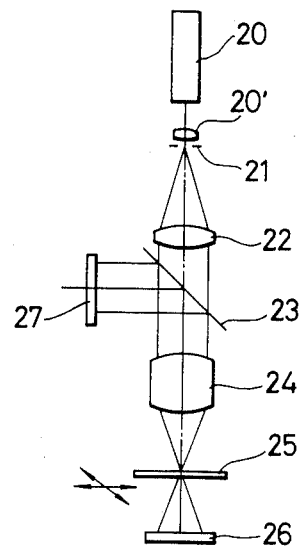
FIG. 9 is an illustration showing the optical system of a first embodiment of the photoelectric microscope using a position sensitive device according to the present invention.

FIG. 9 shows the optical system of a first embodiment of the photoelectric microscope using a position sensitive device according to the present invention. A laser beam emitted from a laser light source 20 passes through a light-collecting lens 20', a spatial filter 21, a collimator 22, a beam splitter 23 and an objective lens 24, to be projected as a spot light onto a sample 25. The light having transmitted through the sample 25 is detected by a detector 26, and the reflection light is detected by a detector 27 via the beam splitter 23. The detectors 26 and 27 are each comprised of a semiconductor PSD in the same manner as that shown in FIG. 6. By these detectors, a differential image of a high sensitivity is detected, and also a non-split ordinary image is detected in accordance with a separate signal processing.

Figure 10:
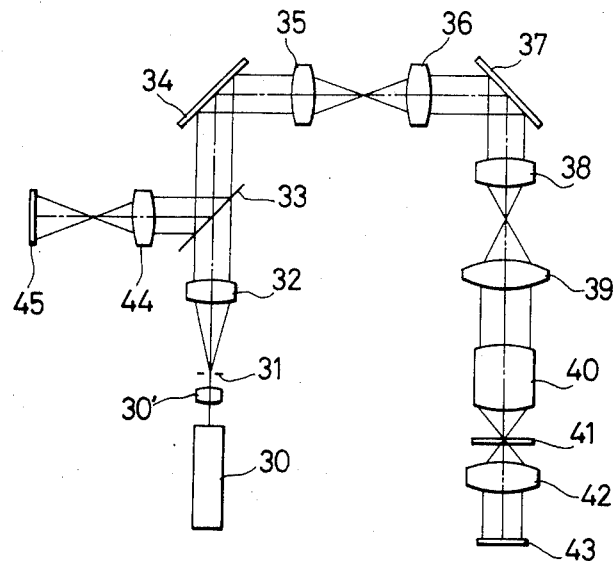
FIG. 10 is an illustration showing the optical system of a second embodiment of the photoelectric microscope using a position sensitive device according to the present invention.

FIG. 10 shows the optical system of a second embodiment of the present invention. A laser beam emitting from a laser light source 30 is passed through a light-collecting lens 30', a spatial filter 31, a collimator 32 and a beam splitter 33 to be incident onto a galvanometric mirror 34 which is set at a pupil position of the optical system. The galvanometric mirror 34 is a pivotal mirror intended to scan the laser beam. The scanned laser beam passes through pupil relay lenses 35 and 36, and impinges onto a galvanometric mirror 37 which is set at the position of the pupil. This galvanometric mirror 37 is also a pivotal mirror intended to scan the laser beam. In case the former galvanometric mirror 34 is assigned to scan the image in the horizontal direction, the latter galvanometric mirror 37 will undertake the scanning in the vertical direction. Two-dimensional scanning is thus performed by these two pivotal mirrors. The laser beam thus subjected to two-dimensional scanning passes through a pupil projecting lens 38 and a focusing lens 39, and impinges onto the pupil of an objective lens 40. Since this optical system is one using a pupil relay system as stated above, it will be noted that the laser beam, even when it is an off-axial one, will impinge, while carrying the pupil information, onto the objective lens 40. This laser beam is then rendered to a spot light by the objective lens 40 when scanning a sample 41.

The laser beam which has been transmitted through the sample 41 passes through a collector lens 42 and is detected by a detector 43 which is provided at the pupil position of the system. Since the detector 43 is provided at the position of the pupil, it will be noted that even in case of an off-axial light, there is obtained information similar to that which is obtained from an on-xial light, and thus a differential image is obtained throughout the entire image.

The laser beam which is reflected at the sample 41 trades back the course of its incidence, and is reflected by the beam splitter 33 and is collected once by a light-collecting lens 44, and thereafter it is detected by a detector 45. The light-collecting lens 44 is not always necessary. However, once the beam is collected by this collector lens, there may be provided either a pin-hole or a black dot-like light-blocking item at the position to which the light is collected, whereby it is possible to observe a common focused image or a dark field image also, in addition to a differential image. The detector 45 becomes equivalent to the instance where it is placed at the position of the pupil, and it allows an off-axial light to be handled equally as in case of an on-axial light.

Here, explanation will be made why, in case observation relies on the method of scanning of the light beam, a light-deflecting member such as a galvanometric mirror is required to be disposed at the position of the pupil of the objective lens, and also why, in case of detection of the transmitted light, there have to be disposed such a light-deflecting member plus a detector at the pupil position of the objective lens.

Figure 11:
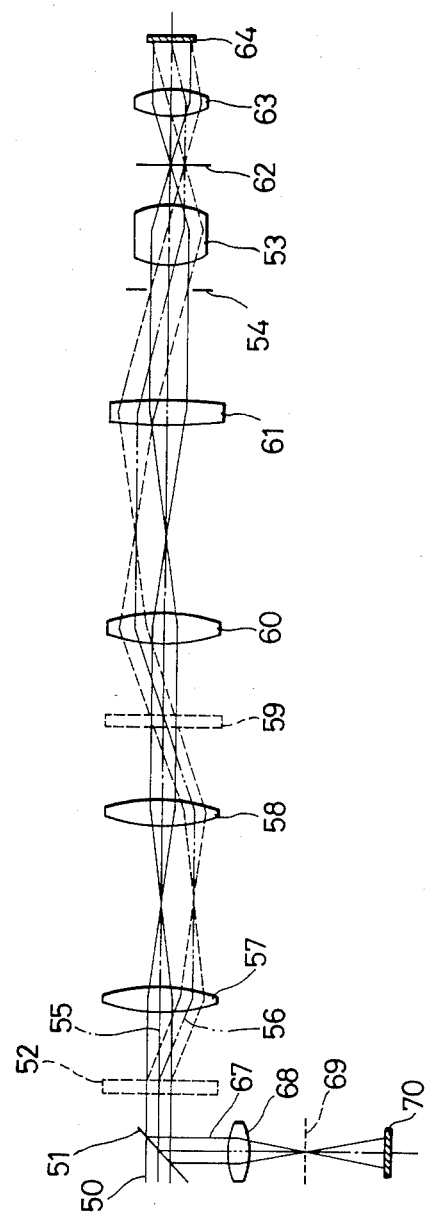
FIG. 11 is an illustration showing the arrangement of a light deflecting member and a detector wherein a pupil is considered.

FIG. 11 is an illustration showing the arrangement of a light-deflecting member and a detector where the pupil is taken into consideration. A light beam 50 coming from a laser which can be considered equivalently as a spot light source passes through a beam splitter 51, and impinges onto a first light-deflector 52. This light-deflector 52 is disposed at a pupil position conjugate with the pupil 54 of an objective lens 53. In case no deflection is performed, the light beam 50 advances along an optical axis 55. In case deflection is performed, i.e., in case the light beam 50 is scanned, it will be noted that, since the light deflector 52 is provided at the position of the pupil, the orientation of the light beam 50 coincides with an off-axial principal ray 56, and the center of the light beam 50 also coincides with the off-axial principal ray 56. Next, these light beams pass through pupil relay lenses 57 and 58 and impinge onto a second light deflector 59 which is disposed at the position of the pupil. In case this light-deflector 59 undertakes the scanning in the direction X among the two-dimensional scanning, the earlier-mentioned light-deflector 52 will undertake the scanning in the direction Y. If a light-deflector is used which is capable of performing deflection in two directions X-Y, the provision of a single light-deflector is enough. The light beam which has been scanned two-dimensionally by the light deflectors 52 and 59 is next caused to impinge onto the pupil 54 of the objective lens 53 by a pupil projecting lens 60 and a focusing lens 61. The off-axial light beam which is formed by the light-deflectors 52 and 59 also is such that its orientation and the center of this beam coincide with the off-axial principal ray 56, so that the off-axial light beam also correctly impinges onto the pupil 54 of the objective lens 53. These light beams produce, onto a sample 62 by the objective lens 53, a spot light which is limited by refraction. By performing scanning two-dimensionally in directions X-Y by the light-deflectors 52 and 59, a spot light thus scans the sample 62 two-dimensionally.

In case an observation is to be performed by using the light which has transmitted through the sample 62, the transmitted light is collected by a condenser lens 63, and is detected by a detector 64. This detector 64 also is disposed at the position of the pupil. In this manner, the off-axial light beam which has been scanned two-dimensionally is caused also to impinge onto a certain constant site on the detector 64 which is disposed fixedly, and thus an accurate differential type detection can be made.

Also, in case a detection is performed using the reflection light coming from the sample 62, the light beam reflected from the sample 62 passes through the objective lens 53 and its pupil 54, and further it passes through the focusing lens 61 and is focused once. This focusing plane is the plane for observing an image on an ordinary optical microscope. Furthermore, the light beam returns onto the light deflector 59 by the pupil projecting lens 60. As stated, the reflection beam returns to the beam splitter 51 by tracing back exactly the same course as that which the beam travelled when it impinged onto the sample, and the reflection beam is derived by the beam splitter 51 to become a detection beam 67. Since the reflection beam has returned after passing through the light-deflectors 59 and 52, it should be noted that, even when an off-axial scanning is made, the detection beam 67 is kept stationary. Accordingly, by means of a detector 70 which is fixedly disposed, an accurate differential type observation can be performed including off-axial scanning.

Reference numeral 68 represents a light-collecting lens, and numeral 69 represents the position at which the detection beam 67 is squeezed into a spot light by the light-collecting lens 68. By providing a pin-hole at this position to which the detection beam is squeezed into a spot light, and by detecting the resulting light by the detector 70 which is located behind the pin-hole, it is possible to obtain a flare-free image of a higher resolution than obtained on an ordinary microscope. Also, it will be needless to say that, without the provision of a pin-hole, an ordinary image can be obtained. Also, by providing a black dot-like light-blocking item at the position whereat the light beam is squeezed into a spot light, a dark field image can be observed easily. Here, the detector 70 is disposed at the location whereat the bundle of light expands. The differential image obtained in such a case concerns the phase of the sample. By bringing this detector 70 to the position at which the light beam is collected by the light-collecting lens 68, and by detecting the light which has been thereby rendered into a spot light, there is obtained a differential image relating to the amplitude of the sample. In contrast thereto, as will be clear from the foregoing description, in case the light-deflecting member or the detector is shifted of its location from the position of the pupil, the center of the light beam will move on the detector when the light beam is scanned. Thus, it will be noted that, in case the observation relies on the light beam scanning method, it is necessary that the light-deflecting member be disposed at the pupil position of the objective lens, and also that in case of detection of an equivalent light, a light-deflecting member plus a detector have to be disposed at the position of the pupil of the objective lens.

As the light-deflecting member, there can be used various kinds of deflectors such as a mirror, a prism, a glass block or an acousto-optic deflector. Also, the signal delivered from the detectors 64 and 70 can be turned so as to be visualized by an indicating means such as a CRT.

In the above mentioned embodiments, the devices are constituted so that a detection can be performed using the transmission light passed through the sample and the reflection light from the sample. However, the practical device may be constituted so that the detection is performed using only one of the transmission light and the reflection light.

Figure 12:
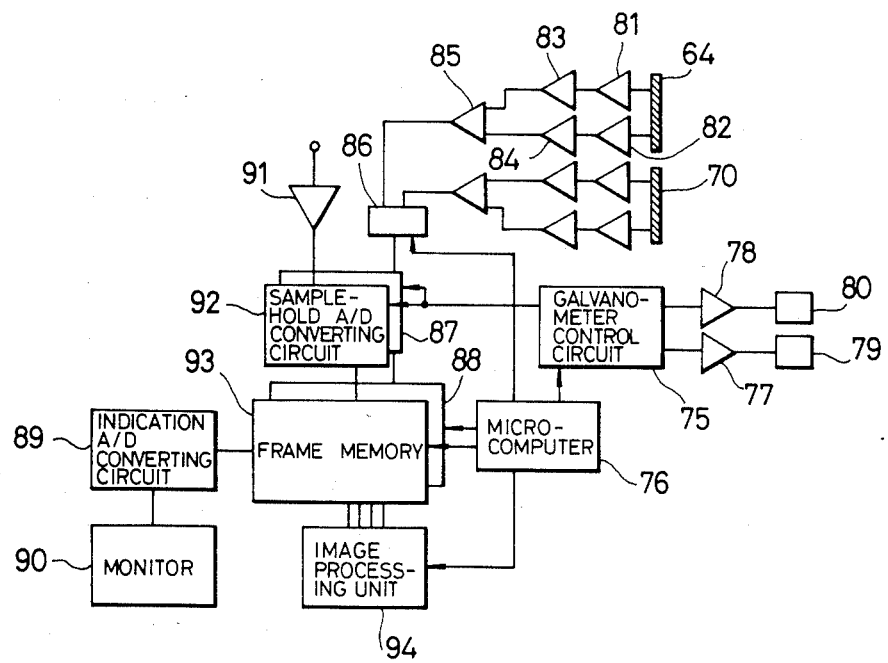
FIG. 12 is a block diagram of the electric circuitry wherein a micro-computer is employed.

FIG. 12 shows a block diagram of the electric circuitry in the case where a micro-computer is employed. Numeral 75 represents a galvanometer controlling circuit which is controlled by a micro-computer 76. Galvanometer controlling circuit 75 actuates two galvanometers 79 and 80 for X-deflection and Y-deflection, respectively, via servo-amplifiers 77 and 78, respectively. The operation modes include, in addition to the X-Y two-dimensional raster scanning intended to obtain an ordinary image as the function of the scanning type laser microscope, a scanning only in the direction X, and also a coordinate-designation mode for irradiating a laser beam only at one arbitrary point in the image. The signal from the detector 64 is supplied to an adder-subtractor 85 via pre-amplifiers 81 and 82 and amplifiers 83 and 84 which have been adjusted for their offset and variable gain. The adder-subtractor 85 performs an addition or a subtraction of two signals, and inputs the result thereof to a multiplexer 86. The signal of the detector 70 is inputted to the multiplexer 86 after passing through a similar circuit. The multiplexer 86 receives a command from the micro-computer 76 and selects either the signal based on the transmission light or the signal based on the reflection light. The image signal selected by the multiplexer 86 is stored in a frame memory 88 by a sample-hold A/D converter circuit 87 which is synchronized with the operation of the galvanometer controlling circuit 75. The stored image signal is indicated on a monitor 90 through an indication D/A converter circuit 89.

Figure 8:
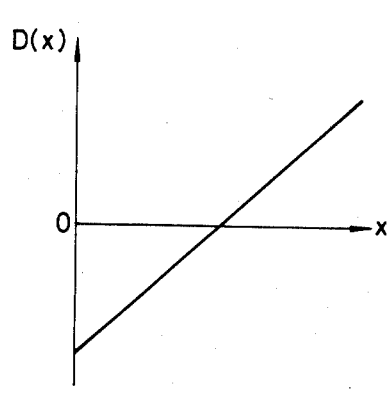
FIG. 8 is an illustration showing the detection sensitivity of the PSD.

Numeral 91 represents an amplifier which is used in case the physical phenomenon produced on the sample by the scanned light is observed to form an image. The output derived from this amplifier 91 is passed through a sample-hold A/D converter circuit 92 to be stored in a frame memory 93 in a same manner as that mentioned just above, and the signal thus stored is indicated on the monitor 90. It should be noted here that, since a high sensitivity differential image as shown in FIG. 8 is obtained from either one of the signals $I_A$ and $I_B$, the amplifiers and adder-subtractors which are provided in two systems (groups) which have been necessary conventionally no longer become necessary, i.e. only one group of amplifier and adder-subtractor is enough, for the observation of a differential image. More particularly, the pre-amplifier 82, the amplifier 84 and the adder-subtractor 85 shown in FIG. 12 will no longer be needed and they are omitted.

Also, as an example of forming an image by observing the physical phenomenon produced on the sample by the scanned light, there is the one that the optically excited electric current generated by the light incident to the pn junction of a semiconductor is observed, or the one that a photo-acoustic wave is detected. In these cases, however, indication can be obtained in quasi-color when superposed on an ordinary image. Numeral 94 represents an image processing unit for such purposes connected to the frame memories 88 and 93.

What is claimed is:

1. A photoelectric microscope using a position sensitive device, comprising:
    a light source;
    an objective lens for collecting a light emitted from said light source onto an object to be observed; and
    a position sensitive device having a single surface receiving said light and at least a pair of output electrodes, in which there is a difference between an output signal derived from one of said pair of output electrodes which is taken as a first electrode and an output signal derived from the other of said pair of output electrodes which is taken as a second electrode in accordance with a position of incidence of the light impinging onto said single surface receiving the light, wherein a light which is collected by said objective lens and has passed through or has reflected on the object is received by said position sensitive device, a signal being so formed by the difference in the output signals derived from said first and second electrodes that a differential image of the object may be obtained, and a signal being so formed by the sum of the output signals derived from said first and second electrodes that an ordinary image of the object also may be obtained.

2. A photoelectric microscope using a position sensitive device according to claim 1, further comprising:
an image processing and indicating means connected to said position sensitive device to make easy the observation of the image of said object requiring observation.

3. A photoelectric microscope using a position sensitive device according to claim 1, further comprising:
light-deflecting means disposed between said light source and said objective lens for scanning the surface of said object requiring observation by varying the angle of incidence of light impingint into said objective lens, said light-deflecting means being disposed either at a pupil of said objective lens, at a position conjugate with said pupil position, or at a position in the vicinity of either one of these positions.

4. A photoelectric microscope using a position sensitive device according to claim 1, in which:
a signal is so formed by any one of the output signal derived from said first electrode and the output signal derived from said second electrode that a differential image of the object may be obtained.

5. A photoelectric microscope using a position sensitive device according to claim 1, in which:
scanning is performed by moving said object in the two-dimensional direction in a plane which is perpendicular to the optical axis of said objective lens.

6. A photoelectric microscope using a position sensitive device according to claim 3, in which:
said light deflecting means is comprised of a pair of light deflectors arranged so as to enable a scanning of the surface of said object requiring observation in directions crossing each other at right angles to thereby allow a two-dimensional scanning.

7. A photoelectric microscope using a position sensitive device according to claim 3, further comprising:
an image processing and indicating means connected to said position sensitive device to make easy the observation of the image of said object requiring observation.

8. A photoelectric microscope using a position sensitive device according to claim 4, further comprising:
an image processing and indicating means connected to said position sensitive device to make easy the observation of the image of said object requiring observation.

9. A photoelectric microscope using a position sensitive device according to claim 5, further comprising:
an image processing and indicating means connected to said position sensitive device to make easy the observation of the image of said object requiring observation.

* * * * *